April 7, 1925.  1,532,705
A. LEVIN
METHOD AND APPARATUS FOR MEASURING PULSATING PRESSURES
Filed July 14, 1924   5 Sheets-Sheet 1

Inventor
Abram Levin
By
B. Singer, Atty

April 7, 1925.

A. LEVIN 1,532,705

METHOD AND APPARATUS FOR MEASURING PULSATING PRESSURES

Filed July 14, 1924   5 Sheets-Sheet 3

Inventor
Abram Levin
By B. Singer, Atty

April 7, 1925.  
A. LEVIN  
1,532,705  
METHOD AND APPARATUS FOR MEASURING PULSATING PRESSURES  
Filed July 14, 1924  5 Sheets-Sheet 4
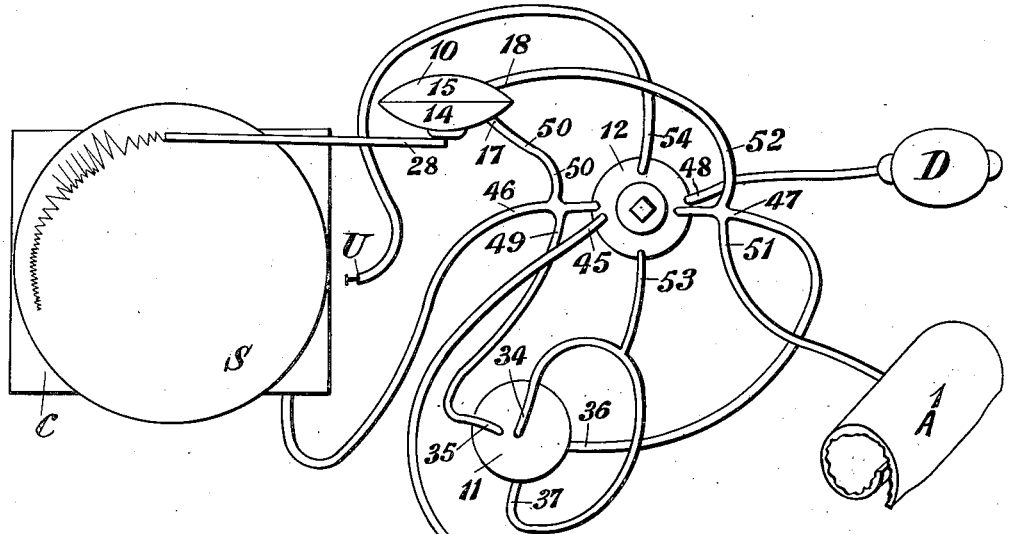
Fig. 5.
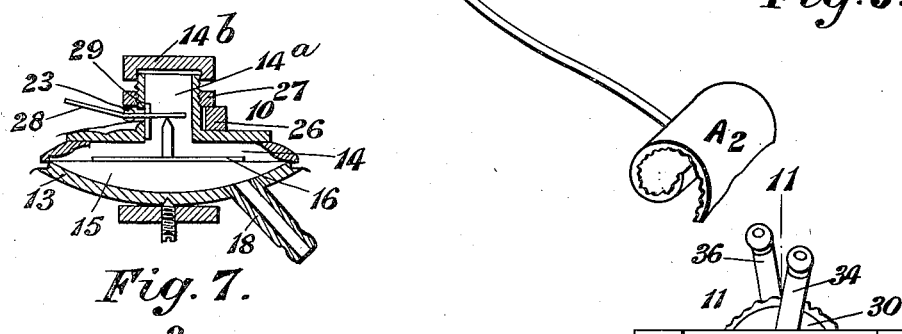
Fig. 7.
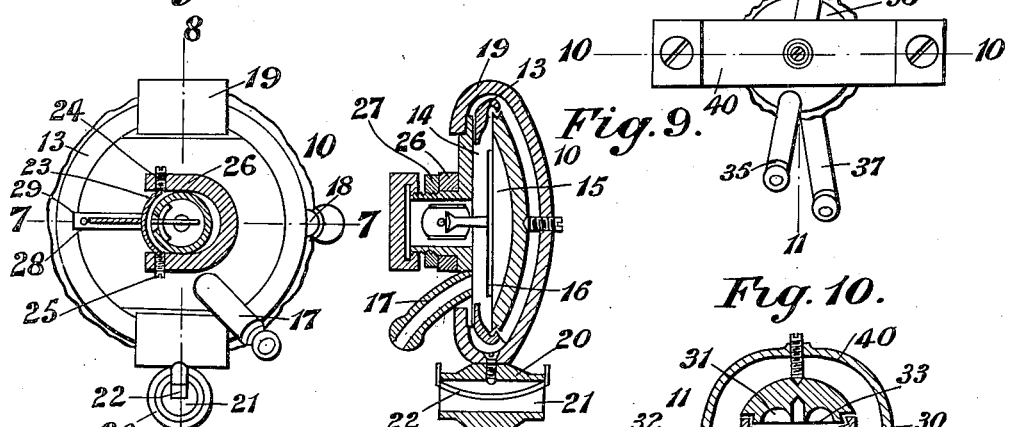
Fig. 6.   Fig. 8.
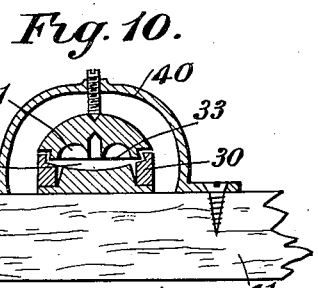
Fig. 9.
Fig. 10.
Inventor  
Abram Levin  
By B. Singer, atty.

April 7, 1925. 1,532,705
A. LEVIN
METHOD AND APPARATUS FOR MEASURING PULSATING PRESSURES
Filed July 14, 1924 5 Sheets-Sheet 5
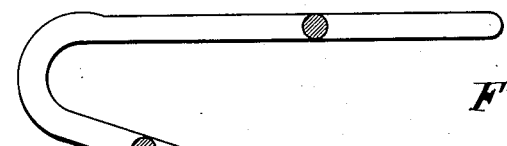
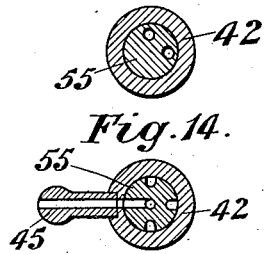
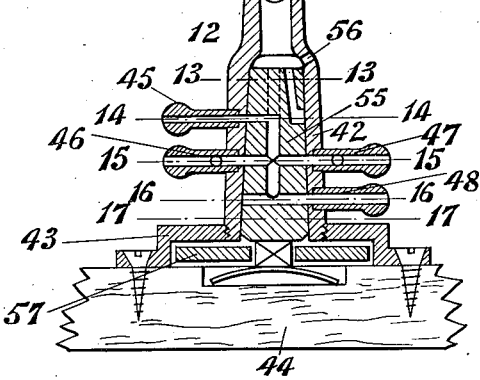
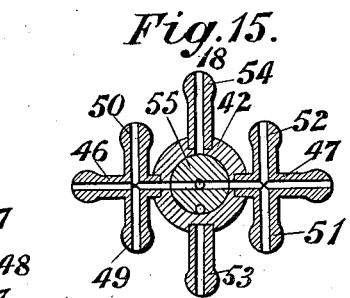
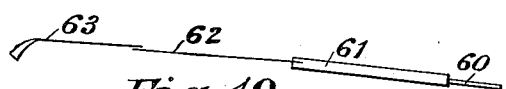
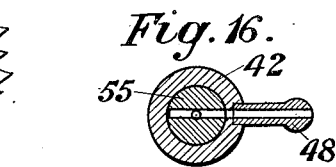
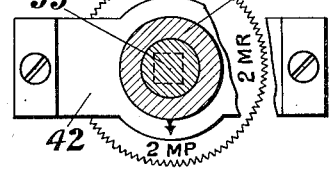
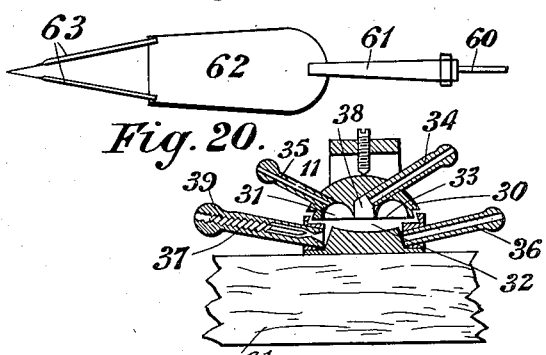
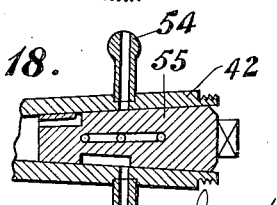

Patented Apr. 7, 1925.

1,532,705

UNITED STATES PATENT OFFICE.

ABRAM LEVIN, OF SIMFEROPOL, RUSSIA.

METHOD AND APPARATUS FOR MEASURING PULSATING PRESSURES.

Application filed July 14, 1924. Serial No. 726,053.

*To all whom it may concern:*

Be it known that I, ABRAM LEVIN, a citizen of the Russian Republic, and resident of Simferopol, Russia, have invented certain new and useful Improvements in Methods and Apparatus for Measuring Pulsating Pressures, of which the following is a specification.

This invention relates to an improved method of and means for measuring pulsating pressures.

One object of the invention is the provision of a method and apparatus for sensitively indicating the nature and pressure characteristics of the pulsations as a basis for analytical study of the same. A further object is to provide an improved method and means for this purpose whereby inter alia a curve may be produced which will illustrate graphically the manner in which the pulsating pressure fluctuates and at the same time will afford a quantitative measure of the pressure at various points thereupon.

The invention may be said to consist broadly in the method of measuring a pulsating pressure according to which firstly a steadily varying pressure is applied in opposition to said pulsating pressure and secondly certain pressures of said steadily varying pressure are ascertained at which a pulsation, throughout a given portion of its pressure curve, is capable of adding an increment to said steadily varying pressure.

The invention is embodied in the present instance in an instrument for the measurement of blood pressure illustrated in the drawings accompanying the present specification; and this embodiment will now be described, it being understood that the particular constructions and arrangements shown in the drawings are susceptible of various modifications without departing from the scope of the invention as defined in the appended claims.

In the drawings—

Fig. 5 is a schematic view of a modified embodiment of the invention showing an instrument and its appertaining parts in assembled relation.

Fig. 6 is a plan of the oscillograph shown in Figure 5.

Fig. 7 is a cross section through line 7—7 of Fig. 6.

Fig. 8 is a cross section through line 8—8 of Fig. 6.

Fig. 9 is a plan of the pressure regulator shown in conjunction with the oscillograph shown in Figs. 6–8.

Fig. 10 is a cross section through line 10—10 of Fig. 9.

Fig. 11 is a cross section through line 11—11 of Fig. 9, the four outlet nipples being shown in section for clearness.

Fig. 12 is a part sectional elevation of a cock comprised in said modified embodiment.

Fig. 13 is a section through line 13—13 of Fig. 12.

Fig. 14 is a section through line 14—14 of Fig. 12.

Fig. 15 is a section through line 15—15 of Fig. 12.

Fig. 16 is a section through line 16—16 of Fig. 12.

Fig. 17 is a section through line 17—17 of Fig. 12.

Fig. 18 is a vertical section through line 18—18 of Fig. 15.

Fig. 19 is an elevation of a suitable recording pen for use with either of the embodiments, and Fig. 20 is a plan of the same.

Describing first the modification of Figures 1 to 4 inclusive, A represents a flexible container means in the form of a double pneumatic cuff consisting of two separate flexible pneumatic containers or jackets $A_1$ and $A_2$ and a common enclosing jacket $A_3$ for said pneumatic jackets provided with straps $A_4$ and $A_5$ whereby said pneumatic jackets are adapted to be maintained in situ. This double pneumatic cuff is adapted to be applied and strapped tightly say to the wrist or upper arm of the patient, the auxiliary pneumatic jacket $A_2$ being higher up the arm and therefore nearer to the heart than the jacket $A_1$.

B represents a manometric device or oscillograph adapted to respond to the pulsatory pressures. This instrument comprises a body portion divided by means of two resilient diaphragms $a$ and $b$ into three parts I, II and III (see particularly Fig. 3). The part I is in permanent communication with the part III by way of the passage $c$ and the part III is adapted to communicate with the atmosphere by way of a passage $k$. The inner end of this passage $k$, however, is offset from the lower wall of the said part III, and the diaphragm $b$ is normally adapted to contact against this offset end and thereby to close the passage $k$. In the event however of the pressure in the part II falling below that in the part I (and therefore below that in the part III which is in communication with the said part I) the diaphragm $b$ will be lifted from the end of the passage $k$ and will thus permit air to escape to the atmosphere until the pressure in the parts I and III is again equal to that in the part II. In other words, assuming the pressure in the part II to be steadily falling the pressure in the parts I and III will fall equally therewith and the pressure on the two sides of the diaphragm $a$ will remain equal and the said diaphragm will not register such steady fall in pressure. On the other hand during pulsating increments of pressure applied to said part II the pressure on the lower side of the diaphragm $a$ will accordingly rise above that on the upper side and the diaphragm $a$ will register such pulsatory increments.

Figure 2:
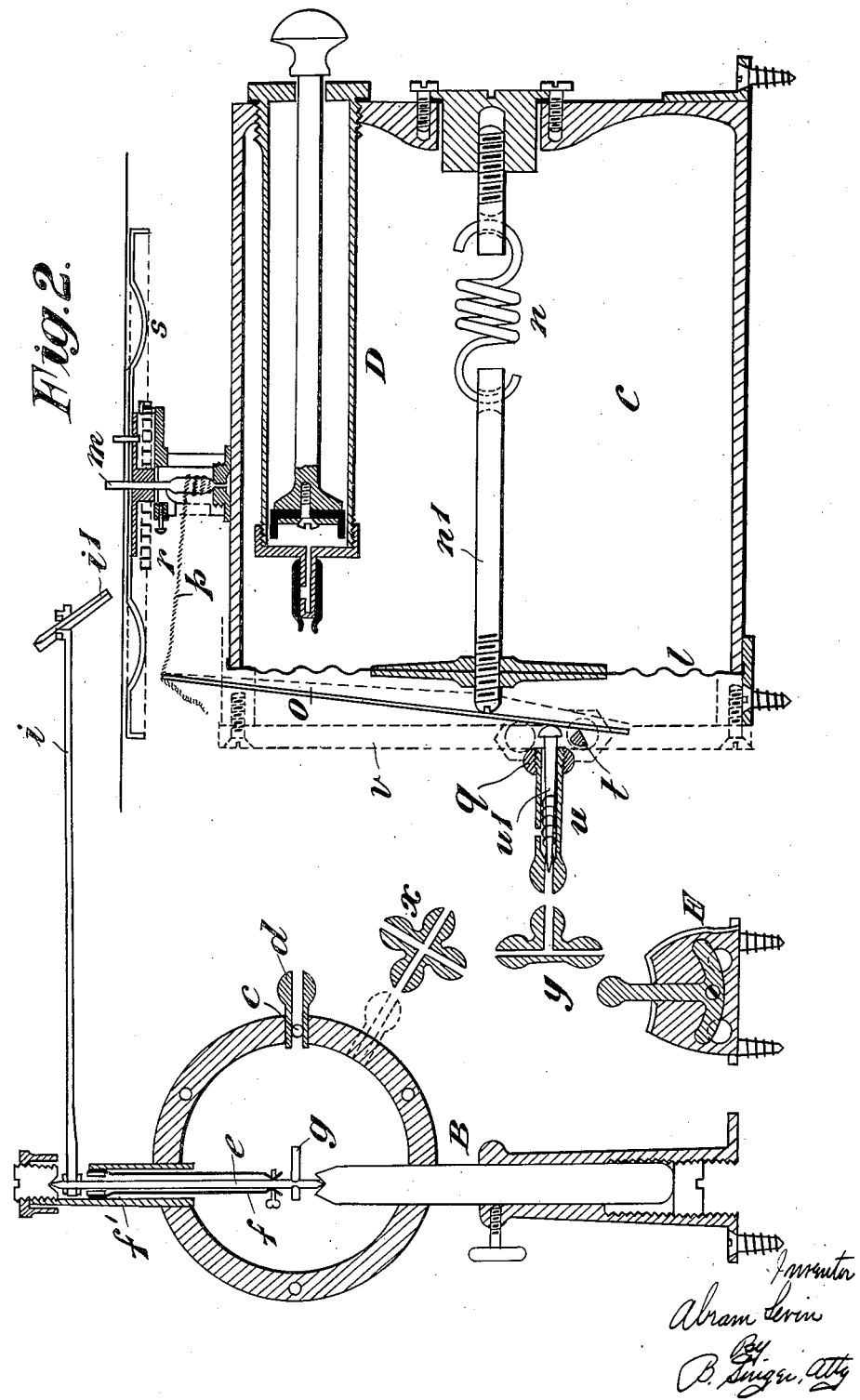
Fig. 2 is a sectional elevational view in operative corelation of the oscillograph (or the instrument which is adapted to respond to the pulsating pressures) and the manometer (or the instrument which is adapted to respond to the steadily varying pressure) certain of the other parts being shown separately.
Figure 3:
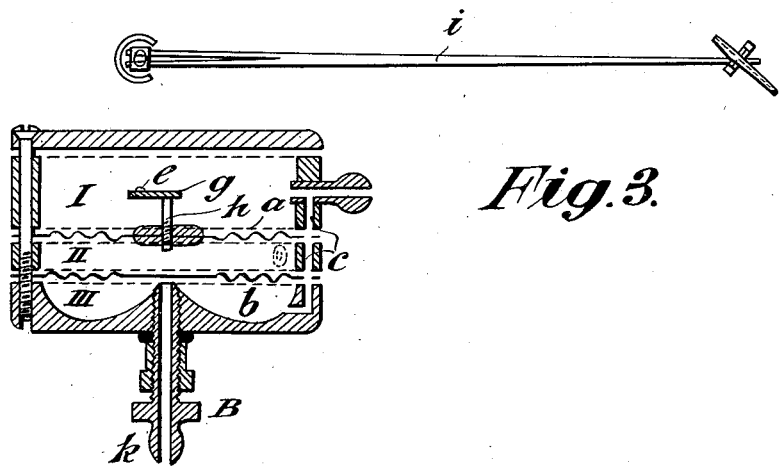
Fig. 3 is a sectional plan view of the oscillograph and Fig. 4 is an end elevational view of the manometer.
Figure 4:
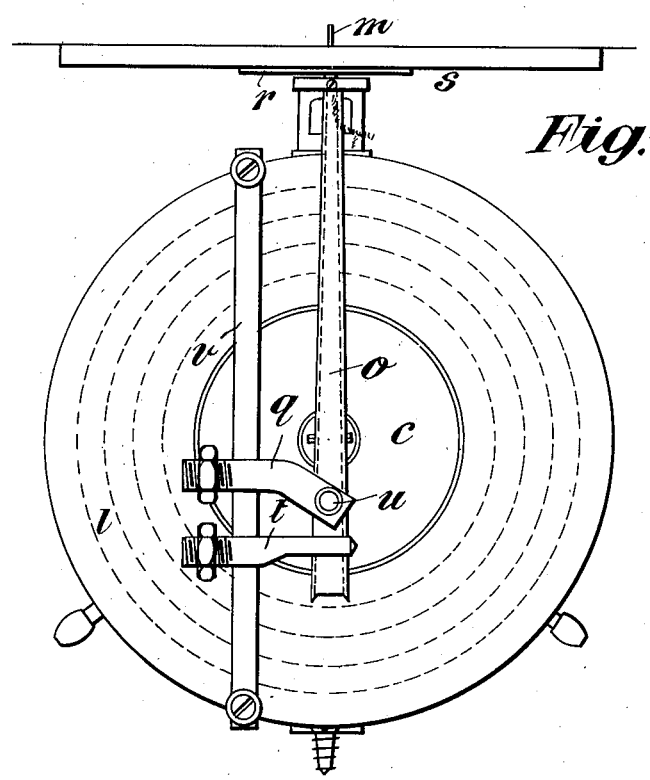

The means by which the movement of the diaphragm $a$ is adapted to be transmitted to the outer atmosphere comprises a spindle $e$ mounted horizontally in adjustable end bearings as shown in Fig. 2 said spindle extending by way of a metallic tube $f'$ mounted in the body of the oscillograph from the interior of the part I to the outer atmosphere, a rod $h$ mounted vertically to the centre of the diaphragm $a$, a link $g$ connecting said rod $h$ to said spindle $e$ and a pointer $i$ mounted to said spindle $e$ at the end thereof which extends into the atmosphere. At the end of the pointer $i$ is some form of marking element pen or pencil $i$ as shown.

In order to prevent the escape of air from the part I by way of the pipe $f'$, a rubber tube $f$ is provided one end of which is hermetically sealed around the inner periphery of the tube $f_1$ and the other end of which is hermetically sealed around the spindle $e$.

Working in co-operation with the oscillograph B and the double pneumatic cuff A is a manometer C which consists primarily of a cylinder having one end thereof closed by means of a resilient diaphragm $l$.

This cylinder moreover is fitted with a pump D by means of which air is adapted to be pumped thereinto and in order that the diaphragm $l$ may withstand the pressure of air thus applied it is reinforced by means of a spring $n$ in the manner shown.

Mounted on the top of the said cylinder of the manometer is a vertical shaft $m$, and this shaft $m$ carries a record element or disc $s$ upon which circles of recording paper are adapted to be placed. Movement is adapted to be transmitted from the diaphragm $l$ to this disc $s$ through the medium of a lever $o$ fulcrumed at $t$ and engaged by the projecting end of the bolt $n_1$ as shown, the end of said lever being connected to the said shaft $m$ by means of a silk thread $p$ wound upon the latter. The silk thread $p$ is maintained permanently in tension by means of a watch spring $r$ biasing said disc $s$ in a counter clockwise direction. The said fulcrum $t$ of the lever $o$ is carried by a supporting bar $v$ secured to the cylinder of the manometer as shown.

Figure 1:
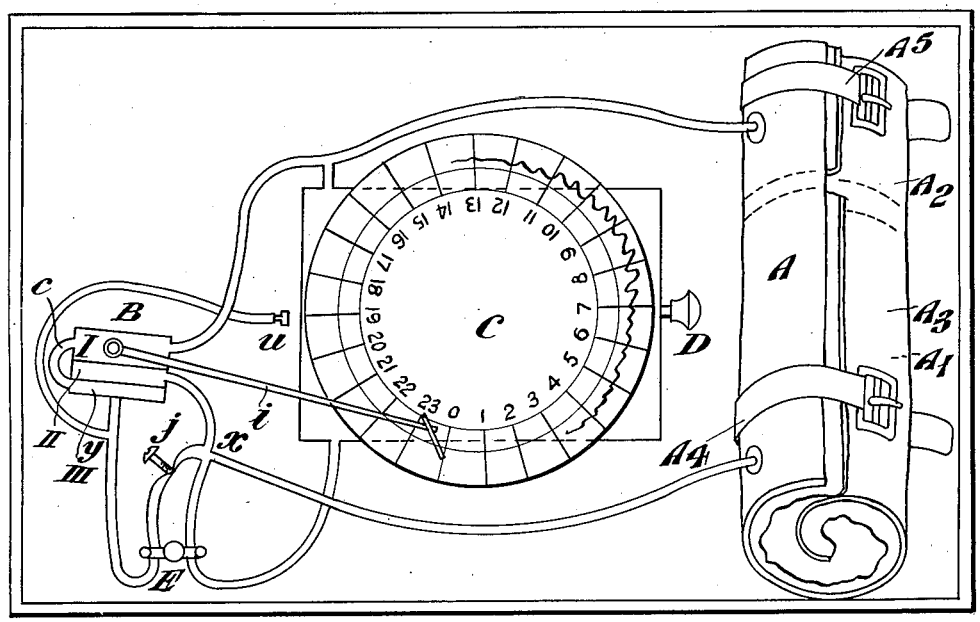
Fig. 1 is a schematic view of an instrument embodying the present invention with its appertaining parts in assembled relation.

As shown in Figs. 1 and 2 the pen at the end of the pointer $i$ is arranged in operative relation with the paper on the surface of the disc $s$.

The manner in which the double pneumatic cuff A, the oscillograph B and the manometer C are intercommunicated is shown in Fig. 1. Thus the pneumatic sleeve $A_2$ and the part I and therefore the part III of the oscillograph both permanently communicate, as shown, with the main cylinder of the manometer. The pneumatic sleeve $A_1$ communicates direct with a four way connection $x$ and from there it is, on the one hand, in permanent communication with the part II of the oscillograph and on the other hand in communication either, by way of a three way connection $y$, with a valve $u$ by which escape to the atmosphere is permitted or with the main cylinder of the manometer. By virtue of the clip E only one of these last communications can be established at a time.

The aforedescribed passage $k$ leading from the part III of the oscillograph communicates (by way of said three way connection $y$) with said escape valve $u$.

The operation of the instrument will now be described:—

The double cuff is first strapped as aforedescribed on to the wrist or arm of the patient (the pneumatic sleeve $A_2$ being higher up the arm than the sleeve $A_1$); the clip E is then adjusted so that communication from the four way connection $x$ is closed to the valve $u$ and is opened to the manometer C, and the pump D is next operated until a suitable pressure is attained in the manometer. By means of the permanent communications described the pressure in the manometer will be transmitted to the jacket $A_2$ and to the parts I and III of the oscillograph, and by virtue of the clip E being adjusted as stated this pressure will also be transmitted to the part II of the oscillograph and to the pneumatic jacket $A_1$. Thus at this moment the manometer, both the pneumatic jackets and all the parts of the oscillograph are raised to the said suitable pressure, and it should be moreover noted that the pressure in the parts II and III of the oscillograph being equal, the passage $k$ will be closed to the valve $u$ and the pressure in the whole system will be sustained.

The clip $j$ is next adjusted so that the passage from the four way connection $x$ to the three way connection $y$ is nearly closed, and the clip E is moved to its position in which the connection $x$ communicates with the connection $y$ and not with the manometer.

Upon the latter operation air begins to escape to the atmosphere from the part II of the oscillograph and the jacket $A_1$ through the escape valve $u$ and this causes a gradual fall of pressure in the said part II.

But, as before described, by virtue of the cooperation of the automatic valve means formed by passage $k$ and the diaphragm $b$, such fall in pressure is kept pace with by the counterbalancing pressure in the parts I and III of the oscillograph and therefore by the pressure in the manometer and the pneumatic jacket $A_2$. Such fall in pressure will accordingly cause as aforedescribed the disc $s$ and the paper thereon to be slowly rotated with the oscillograph pen thereagainst. At this moment therefore we have the pressure of the whole system uniform and steadily falling, and it should be noted that the position of the oscillograph pen considered in its circumferential relation to the recording paper affords a measure of the actual pressure in the said system.

Assuming that the pressure to which the system was first raised is greater than the maximum blood pressure of the patient, the pneumatic jacket $A_2$ will, when the pressure first starts falling, prevent any of the blood pulsations of the patient from reaching the pneumatic jacket $A_1$. It is true that, owing to inertia, what is known as side waves will be produced in the pneumatic jacket $A_2$ even when the pressure thereof is greater than the maximum blood pressure, but these side waves will be lost in the large capacity manometer cylinder, and by virtue of the pneumatic jacket $A_2$ no pulsations will reach the pneumatic jacket $A_1$ until the pressure in the system falls to a point just lower than the maximum pressure of the patient's blood. Immediately however the pressure in the system does fall below the maximum pressure of the patient's blood, the pulsations, throughout a small portion of their pressure curve—i. e., at the apex of their pressure curve—will pass both pneumatic pressure jackets and will accordingly apply intermittent increments of pressure to the opposing pressure in jacket $A_1$ and these increments as above described will be registered by the diaphragm $a$, and therfore by the pen at the end of the pointer $i$ although said diaphragm is not affected by the steadily falling pressure. Thus at this moment the apices of the pulsation pressure curve will begin to be recorded on the paper and as the pressure in the system falls still further more of the pulsation pressure curve will appear on the paper, until, when the said pressure in the system falls below the minimum blood pressure the whole of the pulsation pressure curve will appear.

Thus, first a plain circumferential line will be traced on the paper, then the extreme apices of the pulsation pressure curve will appear and ultimately the whole pulsation pressure curve will appear; and it should be noted that the position circumferentially of the recording paper at which the apex of the pulsation pressure first appears affords a quantitative measure of the maximum blood pressure and that the like position at which each other part of the curve appears gives a quantitative measure of the pressure at that particular part, in other words the instrument both traces the shape of the pulsation pressure curve and affords a quantitative measure of the pressure of each part of it. In practice the paper discs are graduated as shown in the drawing, so that the pressure at any point on the pulsation pressure curve can be ascertained at sight.

It will be noted that unless some compensating device were adopted the air will escape and the pressure would fall more quickly when the pressure is high than when it becomes lower and accordingly the pulsation pressure curves recorded would be first spaced apart from one another more widely than afterwards. To avoid this such a compensating device is provided within the escape valve $u$ itself, a needle $u_1$ being spring biased against the lever $o$ so as to move therewith in such manner that as the pressure within the system falls and the diaphragm $l$ and lever $o$ move to the right the needle $u_1$ also moves to the right and widens the path of escapement through the valve $u$ to the atmosphere. This valve is so adjusted that pulsations having equal time intervals between them will have their curves equally spaced apart on the paper throughout the operation. The said valve $u$ is supported by its being screwed, as shown, into a rod $q$ carried by the aforementioned bar $v$.

Describing now the embodiment of the invention illustrated in Figures 5 to 20 inclusive the primary differences of this from the embodiment just described reside firstly in the oscillograph 10 being of different construction in respect to the transmission means from the diaphragm thereof to the recording pen, secondly in the employment of a separate device 11 for equalizing the pressure on the two sides of the oscillograph diaphragm and thirdly in the use of a special control cock 12 for selectively completing the communications for pumping and for recording. In its functional characteristics this embodiment is essentially similar to that first described.

Considering first the oscillograph 10 and referring to Figs. 6, 7 and 8, the same comprises an enclosed main chamber 13 divided into two compartments 14 and 15 by means of a resilient diaphragm 16. The compartment 14 is provided with an ingress or egress nipple 17 and the compartment 15 is provided with a similar nipple 18 and the compartment 14 includes a turret portion 14$^a$ closed by a cap 14$^b$. The whole is supported in a bracket 19 which has secured thereto an attaching member 20 having a cylindrical bore 21 in which is a spring 22. The member 20 is adapted to be engaged with a member of a supporting bracket hereinafter to be described in connection with the regulating cock illustrated in Figs. 12 to 18, with the spring 22 affording a friction grip against said member whereby the whole oscillograph is supported firmly in an adjusted position. Movement of the diaphragm is adapted as in the previous embodiment to be transmitted to a recording pen cooperating with a manometer-driven disc, and the transmission means in the present embodiment are as follows:—

A spindle 23 is mounted in end bearings 24 and 25 carried by a U shape support 26 held in situ by means of a nut 27, and this spindle 23 is formed as shown with its centre portion eccentric with respect to its ends. A pointer 28 is rigidly carried by the centre portion of this spindle at right angles thereto and extends from the outer atmosphere to the interior of the compartment 14 through an opening formed in the metal of the main chamber 13; and the construction is such that this opening is exactly in line with the bearing points of the spindle 23 so that that part of the pointer which lies within this opening does not move linearly when the pointer rotates about the said bearing points. The space between the pointer and this opening is sealed by means of some flexible material such as a rubber membrane 29 or a spot of rubber glue or solution. Thus the pointer 28 is free to rotate about the bearings 24 and 25 in response to movements of the diaphragm 16 and thereby transmits such movements to a recording pen, and at the same time the interior of the oscillograph is hermetically sealed.

Considering next the pressure regulator 11 adapted to operate in conjunction with the oscillograph and referring to Figs. 9, 10 and 11 the said pressure regulator comprises an enclosed chamber 30 divided into two compartments 31 and 32 by means of a resilient diaphragm 33. The compartment 31 is provided with nipples 34 and 35 and the compartment 32 is provided with nipples 36 and 37. The end of the passage 38 which communicates with the nipples 34 is offset as shown so as to abut against and be closed by the diaphragm 33 when the latter is in its normal position; and the nipple 37 is partially and variably obstructed by means of screw threaded needle valve 39 as shown. The whole is maintained in position by means of a holding down bracket 40 screwed on to a base 41.

Considering next the control cock 12 illustrated in Figs. 12 to 18 the same comprises an unright tubular portion 42 rigidly secured, by means of a bracket 43 to base 44. This tubular portion 42 is provided with ingress or egress nipples 45 to 54 and an escape orifice 56, and has a rotatable plug 55 fitted therein which plug is provided with a number of ports whereby, by rotary adjustment of the said plug the nipples 45 to 54 may be made to intercommunicate in a variety of ways to be hereinafter described. The plug 55 is rigidly connected to a graduated milled edge disc 57 by which it is adapted to be rotated to its several positions. Secured to the upper end of the tubular portion 42 is a supporting bracket 58 to a member of which the oscillograph 10 is adapted to be mounted in the manner hereinbefore described. This supporting bracket can also be used for carrying one or two drums Marey for poligraphy.

I will now describe with reference to all the Figs. 5 to 20 inclusive the manner in which the above parts inter-operate. It will be seen from Fig. 5 that pneumatic sleeves $A_1$ and $A_2$ and a manometer C operating a recording disc $s$ are connected in the system. These parts are adapted to operate in substantially the same manner as are the corresponding parts comprised in the former embodiment and no further description thereof is deemed necessary. The valve V shown in Fig. 5 is also the same in its operation as the similarly designated valve described in connection with said former embodiment. The pneumatic sleeves are first strapped on to the patient's arm in the same manner as in said former embodiment and the cock 12 is adjusted to the position illustrated in Figs. 12 to 18 in which the arrow on the bracket 43 is adjacent the mark 2MP. In this position as is quite clear from the drawing all the nipples 45 to 52 are in communication with one another and the nipples 53 and 54 are cut off from the other nipples of the cock and from one another. That is to say (as is clear from reference to Fig. 5) the bulb pump D, communicates directly with both pneumatic jackets, the manometer, both compartments of the oscillograph and (by way of nipples 36 and 35) with both compartments of the pressure regulator. By virtue of the nipples 53 and 54 being cut off as above described however, flow through the escape valve U and also the two nipples 34 and 37 of the pressure regulator is prohibited. With the cock at this setting the pump D, is operated and the whole system as in the case of the former embodiment is raised to a pressure above maximum blood pressure. The cock is then turned through a right angle to the position in which the mark 2MR is adjacent the arrow and in this position (as will be clear from Figs. 12 to 18) the nipple 45 is in communication with the group of nipples 46, 49 and 50, the nipples 53 and 54 are in communication with one another, the nipple 48 is cut off by the plug 55 and the group of nipples, 47, 51 and 52 are also jointly cut off by said plug 55. Thus (referring again to Fig. 5) free communication is established throughout one group comprising the manometer, the compartment 14 of the oscillograph, the compartment 31 of the regulator and the jacket $A_2$, and a second group comprising the compartment 15 of the oscillograph, the compartment 32 of the regulator and the jacket $A_1$. Communication with the second of the said groups is established with the atmosphere through the valve $u$ the nipples 53 and 54 and the needle valve 39 in the nipple 37, and air therefore escapes slowly from said second group. Immediately however the pressure in said second group falls below that in the first group, the diaphragm 33 of the pressure regulator will bulge downwards and uncover the nipple 34 whereupon, as will be clear from Fig. 5 the two groups communicate and the pressures therein become equalized.

Thus, as in the case of the former embodiment the pressure of the whole system falls uniformly and is not recorded by the oscillograph.

When pulsating increases of pressure are produced in the pneumatic jacket $A_1$ however these will be transmitted directly to the second of the two groups which as aforestated includes the compartment 32 of the pressure regulator.

The nipple 34 of the regulator will therefore be held closed by the diaphragm 33 and will thus cut off communication between the two groups; and the pressure in said second group will rise above that of the first group. This means that the pressure of the compartment 14 of the oscillograph will rise above that of the compartment 15 of the oscillograph and that the diaphragm 16 will respond accordingly.

From the above it will be seen that with the cock in the position 2MR the embodiment now being described will operate to record on paper carried by the disc $s$ in exactly the same manner as the embodiment first described. The side waves will be absorbed, as before, in the high capacity cylinder of the manometer (which as shown is in direct communication with the jacket $A_2$) and when the pressure in the system gradually falls until the pulse waves can pass the jacket $A_1$ these pulse waves will cause corresponding oscillations of the diaphragm of the oscillograph and will be recorded on the disc $s$, the said disc $s$, rotating as before, with the falling pressure in the system.

A further refinement however has been given to the embodiment now under consideration and this will be appreciated by considering the communications established when the plug 55 of the cock 12 is operated to the position in which the mark 1MP is adjacent the arrow.

In this position as will be clear from Figs. 12 to 18 the pneumatic jacket $A_2$ communicates with the outer atmosphere via nipple 45 and escape orifice 56 and communications are established so that after turning to the position 2MR and fixing the maximum pressure with the two jackets in commission it is possible immediately to pass to position 1MP and fix the minimum pressure by means of the jacket $A_1$ operating alone, the jacket $A_2$ being now not required to stop the side waves.

Referring now to Figs. 19 and 20 the same illustrate a suitable recording pen for use with either of the above described embodiments. In these figures, 60 is the steel end of the pointer adapted to be operated by the oscillograph as described, 61 is a light wooden rod, 62 is member cut from somewhat stiff paper and 63 is two strips of goose quill.

What I claim and desire to secure by Letters Patent is:—

1. A method of measuring a pulsating pressure consisting in opposing to said pulsating pressure a pressure adapted to transmit the pulsations thereof, applying said opposing pressure also to a manometric device, applying a non-pulsating counterbalancing pressure to said device, and continuously varying said opposing and counterbalancing pressures while simultaneously maintaining the latter and said opposing pressure substantially equal to each other, whereby said device is continuously and sensitively actuated solely by the transmitted pulsations of the pressure to be measured, to indicate the same at all pressures in the range of said opposing pressure.

2. A method of measuring a pulsating pressure consisting in opposing to said pulsating pressure a pressure adapted to transmit the pulsations thereof, applying said opposing pressure also to a manometric device, applying a non-pulsating counterbalancing pressure to said device, varying one of said manometric pressures, and utilizing such variation to correspondingly vary the other of said manometric pressures to maintain the latter substantially equal to each other, whereby said device is sensitively actuated solely by the transmitted pulsations of the pressure to be measured, to indicate the same throughout the range of said opposing pressure.

3. A method of measuring blood pressure consisting in applying a flexible container to the body over an artery, inflating said container with an opposing pressure adapted to transmit the pulsations of the blood and applying such pressure also to one side of a manometric diaphragm, applying a non-pulsating counterbalancing pressure to the other side of said diaphragm, continuously reducing said opposing pressure, and employing the reduction thereof to correspondingly reduce said counterbalancing pressure to maintain the same substantially equal to said opposing pressure, whereby said diaphragm is vibrated solely by the transmitted pulsations of the blood, to indicate the pressures thereof throughout the range of said opposing pressure.

4. A method of recording a pulsating pressure consisting in opposing to said pulsating pressure a pressure adapted to transmit the pulsations thereof, applying said opposing pressure also to a manometric device, applying a non-pulsating counterbalancing pressure to said device, continuously varying said opposing and counterbalancing pressures while maintaining the latter substantially equal to said opposing pressure, whereby said device is sensitively actuated solely by the transmitted pulsations to be measured, and employing said device to actuate a marking means for recording a curve of such pulsations.

5. A method of recording a pulsating pressure consisting in opposing thereto a pressure adapted to transmit the pulsations thereof, applying said opposing pressure also to a manometric device, applying a nonpulsating counterbalancing pressure to said device, continuously varying said opposing and counterbalancing pressures while maintaining the latter substantially equal to said opposing pressure, whereby said device is sensitively actuated solely by the transmitted pulsations to be measured, employing said device to actuate one of cooperating marking and record elements, and employing said opposing pressure to actuate the other of said elements.

6. A method of graphically producing a curve representative of a pulsating pressure according to which, firstly, a steadily varying pressure is opposed to said pulsating pressure and secondly a curve is traced the extent of which in one direction represents such steadily varying pressure and in the other direction represents the fluctuation superimposed upon such steadily varying pressure by virtue of said pulsating pressure.

7. A method of graphically producing a pulse curve according to which firstly an inflated flexible container is firmly applied to a convenient part of the body covering an artery, secondly the pressure of inflation of said container is steadily varied, and thirdly a curve is traced the extent of which in one direction represents such steadily varying pressure and in the other direction represents the fluctuations superimposed upon said steadily varying pressure by the pulse waves acting on said container.

8. A method of graphically producing a curve which will illustrate the shape of the pressure curve of the pulse and at the same time will afford a quantitative measure of the blood pressure at various points of said pressure curve, according to which, firstly, an inflated flexible container is firmly applied to a convenient part of the body covering an artery, secondly the pressure of inflation of said container is steadily and unidirectionally varied, and thirdly a curve is traced, the extent of which in one direction gives a quantitative measure of such steadily and unidirectionally varying pressure and in the other direction represents the intermittent fluctuations of pressure within said container which are superimposed upon such steadily and unidirectionally varying pressure by reason of the action of pulse waves on said container.

9. A method of recording blood pressure consisting in applying a flexible container to the body over an artery, inflating said container with an opposing pressure adapted to transmit the pulsations of said blood pressure, applying such opposing pressure also to one side of a manometric diaphragm, applying a nonpulsating counterbalancing pressure to the other side of said diaphragm, varying said opposing and counterbalancing pressures while maintaining the latter substantially equal to said opposing pressure, whereby said diaphragm is sensitively vibrated solely by the transmitted pulsations of the blood, employing the vibrations of said diaphragm to actuate one of cooperating marking and record elements and actuating the other of said elements by said variation of the opposing pressure.

10. A method of recording blood pressure consisting in applying a flexible container to the body over an artery, inflating said container with an opposing pressure adapted to transmit the pulsations of said blood pressure, applying such pressure also to a manometric device, applying a nonpulsating counterbalancing pressure to said device, reducing said opposing pressure and employing such reduction to correspondingly reduce said counterbalancing pressure to maintain the same substantially equal to said opposing pressure, whereby said device is sensitively actuated solely by the transmitted pulsations of the blood, employing said device to actuate one of a pair of cooperating marking and record elements, and employing the variation of said opposing pressure to actuate the other of said elements.

11. In apparatus for measuring a pulsating pressure, the combination of a container having a flexible wall adapted to be subjected to said pressure, a manometric device connected with said container, mechanism for inflating said container with an opposing pressure adapted to transmit the pulsations of the pressure to be measured and for applying a nonpulsating counterbalancing pressure also to said device, and means for continuously varying said opposing and counterbalancing pressures and maintaining the latter substantially equal to said opposing pressure, for sensitively actuating said device solely by the transmitted pulsations to be measured at all pressures in the range of said opposing pressure.

12. In apparatus for measuring a pulsating pressure, the combination of a container having a flexible wall adapted to be subjected to said pressure, a manometric device connected with said container, mechanism for inflating said container with an opposing pressure adapted to transmit the pulsations of the pressure to be measured and for applying a nonpulsating counterbalancing pressure also to said device, means for varying one of said opposing and counterbalancing pressures, and a second means actuated automatically by such variation for correspondingly varying the other of said pressures to maintain them substantially equal to each other for sensitively actuating said device solely by the transmitted pulsations to be measured.

13. In apparatus for measuring a pulsating pressure, the combination of a container having a flexible wall adapted to be subjected to said pressure, a manometric device comprising a chamber having a subdividing diaphragm one side of which is connected with said container, mechanism for inflating said container with an opposing pressure adapted to transmit the pulsations of the pressure to be measured and for applying a nonpulsating counterbalancing pressure to the other side of said diaphragm, means for reducing said opposing pressure and valve means arranged for actuation automatically by such reduction for correspondingly reducing said counterbalancing pressure to maintain the same substantially equal to said opposing pressure, for sensitively actuating said diaphragm solely by the transmitted pulsations to be measured.

14. Apparatus for graphically producing a pulse curve, comprising an inflated flexible container adapted to be firmly applied to a convenient part of the body covering an artery, means for steadily varying the pressure of inflation of said container, a device adapted to move in accordance with such steady variation of pressure but not to be moved by the fluctuations superimposed upon such steadily varying pressure by reason of the action of pulse waves on said container, and a second device adapted to be moved in accordance with said superimposed fluctuations of pressure but not to be moved by said steady variation of pressure and recording mechanism actuated by said first and second devices.

15. In apparatus for recording blood pressure, the combination of flexible container means adapted to be applied over an artery, mechanism for inflating said means with an opposing pressure adapted to transmit the pulsations of the blood pressure, a record element and a cooperating marking element, a manometric device connected with one of said elements for moving the same and arranged for actuation solely by the pulsations transmitted by said opposing pressure, and a second manometric device for actuating the other of said elements and arranged for action by said opposing pressure independently of said pulsations.

16. In apparatus for recording blood pressure, the combination of flexible container means adapted to be applied over an artery, mechanism for inflating said means with an opposing pressure and for steadily varying said pressure, a record element and a cooperative marking element, a manometric device comprising a pressure responsive diaphragm having one side thereof subjected to said opposing pressure and the pulsations transmitted thereby, means for producing on the other side of said diaphragm a nonpulsating pressure maintained substantially equal to said varying opposing pressure, a connection between said diaphragm and one of said elements for actuating the same solely by the transmitted pulsations, and a second manometric device actuated by said nonpulsating pressure for actuating the other of said elements.

17. Apparatus as claimed in claim 14, wherein said steady variation of pressure is a downward variation and wherein said second device comprises a flexible diaphragm or the like one side of which is directly subjected to the pressure in the interior of the container, and the pressure at the other side of which is adapted to fall with falling pressure at said former side but is not adapted to rise with rising pressure at said former side, so that said diaphragm is adapted to be moved by the superimposed fluctuations of pressure caused by the action of pulse waves but is not adapted to be moved by said steady downward variation of pressure.

18. Apparatus as claimed in claim 14 and comprising an auxiliary inflated container the pressure of inflation of which is adapted to vary with the pressure of inflation of said former container and which is adapted to be applied to the body so as to cover the same artery as said former container at a position nearer to the heart for the purpose of preventing pulsations of a pressure lower than the pressure of inflation from affecting said former container.

19. In apparatus for graphically producing a pulse curve, an inflated flexible container adapted to be firmly applied to a convenient part of the body covering an artery, an auxiliary container adapted to be applied to said artery nearer the heart than the first, means for steadily reducing the pressure of inflation of said first container, a flexible diaphragm enclosing at one side thereof a volume of substantial capacity communicating with said auxiliary container, a second flexible diaphragm having one side thereof directly subjected to the pressure in said first container, automatic valve means for producing on the other side of said second diaphragm a pressure adapted to fall with the reduction of pressure on the first side thereof but not to rise with pulsating increases on said first side, and a connection between said other side of said second diaphragm and the volume enclosed by said first diaphragm.

20. Apparatus as claimed in claim 19 comprising a record chart connected with and actuated by said first diaphragm and a cooperating marketing element connected with and actuated by said second diaphragm.

21. Apparatus as claimed in claim 19 in which said automatic valve means comprises an auxiliary flexible diaphragm subjected on opposite sides to the same pressures, respectively, as said second diaphragm, and controls a discharge orifice which is uncovered when the pressure on said first side of said second diaphragm tends to fall below that on said other side of said second diaphragm.

22. Apparatus as claimed in claim 19 wherein said means for steadily reducing the pressure of inflation of said first container comprises a discharge orifice provided with means actuated by the pressure in said volume enclosed by said first diaphragm for automatically increasing the effective size of said orifice as said pressure falls to maintain a constant rate of pressure reduction.

23. Apparatus for graphically producing a curve which will illustrate the shape of the pressure curve of the pulse and at the same time will afford a quantitative measure of the blood pressure at various points of said pressure curve, comprising a manometer adapted to operate as a driving force for the paper on which the record is to be made and an oscillograph adapted to operate a pen or like marking device in contact with the paper substantially as specified.

24. Apparatus as claimed in claim 16, comprising a rotatable record element the rotation of which is controlled by the pressure responsive movements of said second manometric device and a cooperating marking element arranged for movement over said second element by said first manometric device for graphically producing a curve indicating both the shape of the pressure curve of the pulse and also the blood pressure corresponding to the various points of the same.

25. In apparatus for recording blood pressure, the combination of flexible container means adapted to be applied over an artery, mechanism for inflating said means with an opposing pressure and for steadily varying such pressure, a rotatable record disk and a cooperating marking element movable substantially radially thereover, a manometric device comprising a pressure responsive diaphragm having one side thereof subjected to said opposing pressure and the pulsations transmitted thereby, means for producing on the other side of said diaphragm a nonpulsating pressure maintained substantially equal to said varying opposing pressure, a connection between said diaphragm and said marking element for moving the latter to correspond with the pulsating pressure curve of the blood, a second manometric device actuated by said nonpulsating pressure and a connection between said second device and disk for controlling rotation thereof to indicate the blood pressure of the various points of said pressure curve.

In witness whereof I affix my signature.

ABRAM LEVIN.